United States Patent

[11] 3,554,472

| [72] | Inventors | Robert G. Mc Intyre<br>Manhattan Beach;<br>Browning Nichols, Jr., Culver City; Ralph<br>E. Hantzsch, Los Alamitos, Calif. |
|---|---|---|
| [21] | Appl. No. | 838,861 |
| [22] | Filed | July 3, 1969 |
| [45] | Patented | Jan. 12, 1971 |
| [73] | Assignee | The United States of America as represented by the Secretary of the Air Force |

[54] YAW CONTROL STABILIZATION EJECTION SEAT
4 Claims, 4 Drawing Figs.
[52] U.S. Cl. .................................................... 244/122
[51] Int. Cl. ............................................... B64d 25/10
[50] Field of Search ......................................... 244/122,
122.13, 122.14, 122.11, 122.15

[56] References Cited
UNITED STATES PATENTS

| 2,931,598 | 4/1960 | Sanctuary ...................... | 244/122 |
| 3,124,324 | 3/1964 | Martin ........................... | 244/122 |
| 3,362,662 | 1/1968 | Mc Intyre et al ............... | 244/122 |
| 3,442,473 | 5/1969 | Rivedal et al .................. | 244/122 |
| 3,487,445 | 12/1969 | Gluhareff et al .............. | 244/122 |

Primary Examiner—Milton Buchler
Assistant Examiner—Carl A. Rutledge
Attorneys—Harry A. Herbert, Jr. and Charles H. Wagner ABSTRACT: A "yaw" control stabilizing ejection seat structure for high-speed aircraft which comprises a seat ejection rocket barrel secured to the back of the top portion of an ejection seat for limited rotative adjustments about its longitudinal axis. The rocket barrel is secured to and extends downwardly from the top of the back of the seat intermediate the opposite sides thereof and is provided with a downwardly inclined jet discharge opening at its lower end, directing the jet discharge therefrom downwardly and rearwardly away from the back of the ejection seat. A rocket ejection catapult barrel is secured at its lower end to the aircraft structure, adjacent the bottom of the back of the seat and extends upwardly, and receives the ejection seat rocket barrel and its inclined rocket jet discharge opening telescopically therein. Gyroscope means carried by the seat processes in response to "yaw" movements of the ejection seat when ejected out of the aircraft and is connected to the seat ejection rocket barrel to rotatably adjust the rocket barrel about its longitudinal axis to adjust the direction of the thrust of the relatively downwardly inclined jet discharge to resist and counteract "yaw" or rotative movement of the ejected seat as it leaves its guide tracks in the plane. Gyroscope caging means is carried by the seat and means automatically uncages and spins the gyroscope upon the ejection of the rocket barrel from within the catapult barrel to initiate the operation of the "yaw" control of the seat by the gyroscope.

INVENTORS
ROBERT G. McINTYRE
BROWNING NICHOLS, JR.
BY RALPH E. HANTZSCH
Harry A. Herbert Jr.
Charles H. Wagner
ATTORNEYS

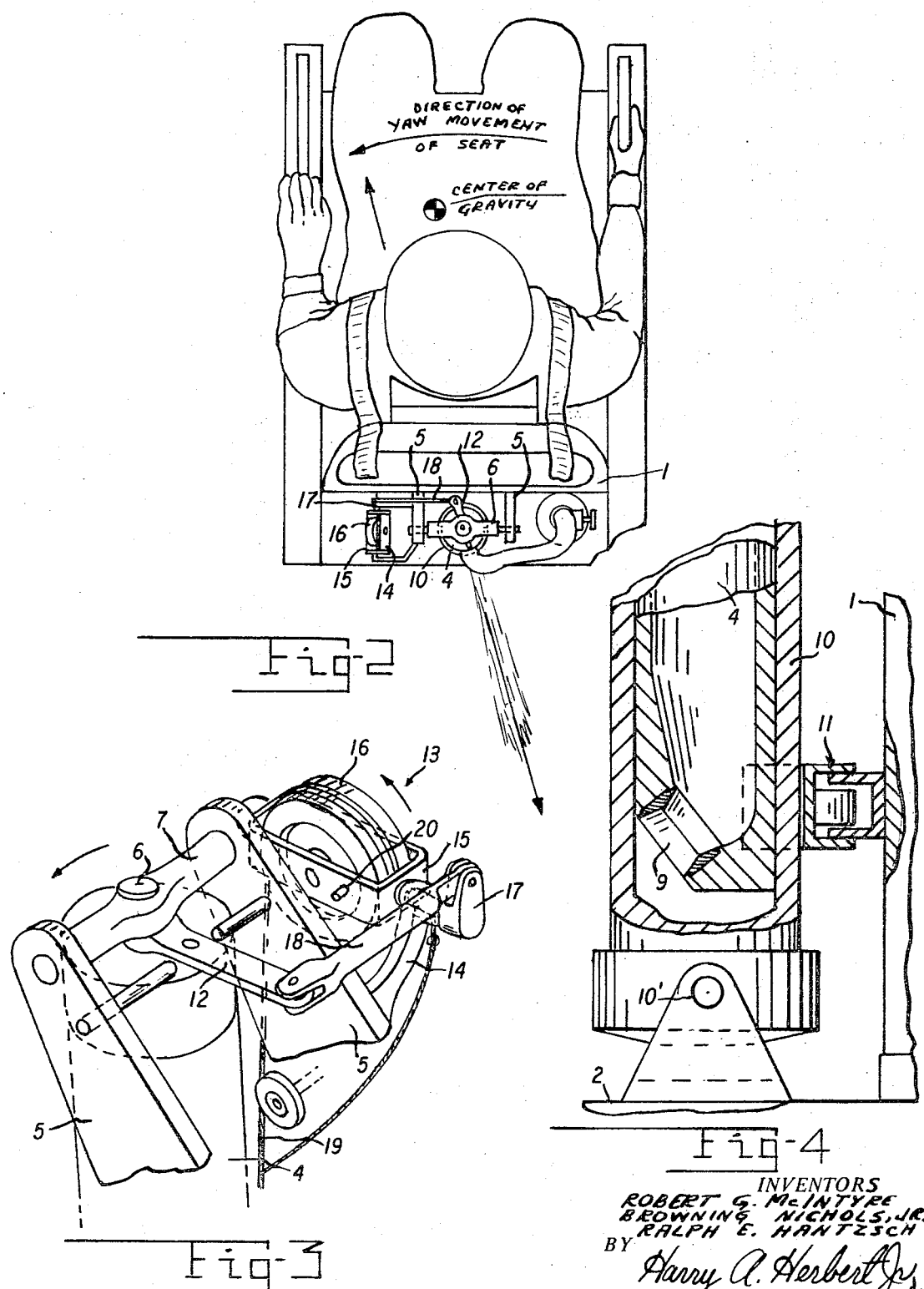

YAW CONTROL STABILIZATION EJECTION SEAT

BACKGROUND OF THE INVENTION

Ejection seats for high-speed aircraft for ejecting the pilot with his seat upwardly from an aircraft in cases of serious emergencies are well known. For instance, the patents to Martin U.S. Pat. No. 3,124,324; Sanctuary U.S. Pat. No. 2,931,598; and McIntyre et al. U.S. Pat. No. 3,362,662, disclose types of ejections seats in which the seat is catapulted in an upward direction out of an aircraft by a rocket motor catapult device. The McIntyre patent discloses a rocket jet ejected pilot's seat which employs two jet motor devices which are both carried by the seat as it is ejected from the aircraft. The patent contemplates one of the jet motors arranged under the seat having a discharge jet opening extending downwardly under the seat with gyroscope means carried by the seat and connected to the under seat rocket motor to adjust the direction of downward thrust in a "fore or aft" direction below the seat to control or prevent any "pitch" movements of the ejection seat (in "fore and aft" directions).

SUMMARY OF THE INVENTION

This invention contemplates the provision of an ejection seat for high-speed aircraft including means that stabilize "yaw" movements when the seat is ejected from the aircraft by a rocket jet motor and catapult device. A rocket motor barrel is anchored to the back of the top portion of the ejection seat for limited rotative adjustment about its longitudinal or central axis, and has a relative downwardly inclined jet discharge nozzle at its lower end, inclining downwardly and rearwardly away from the back of the seat for exerting an upward and forwardly inclined lift or thrust on the seat when the rocket motor is fired. A catapult barrel is secured to the aircraft structure adjacent the bottom of the back of the ejection seat and extends upwardly behind the seat toward the top thereof, midway between the sides thereof, and receives the seat ejection rocket motor barrel and its downwardly inclined jet discharge opening telescopically therein, when the seat is in normal operative condition in the aircraft. Gyroscope control means is carried by the back of the seat, at the top portion thereof with an operating connection therefrom which is connected in offset relation to the top end of the rocket motor barrel for controlling and adjusting the relative rotative position of the rocket barrel and its jet discharge about its longitudinal axis during the ejection of the seat out of the aircraft when the gyroscope is in operation. Caging means is provided for normally caging the gyroscope in predetermined relation to the fore and aft facing direction of the seat before the ejection thereof from the aircraft takes place. Means are provided for initiating the catapulting of the rocket jet motor barrel from the catapult barrel to eject the seat, and simultaneously spinning and uncaging the gyroscope for precession to control the "yaw" movements of the ejection seat by adjusting the direction of thrust of the rocket as the seat leaves its guide rail means in the aircraft.

BRIEF DESCRIPTION OF THE DRAWINGS

FIG. 2 is a somewhat schematic top plan view of the seat disclosed in FIG. 1 showing the ejection seat tendency to rotate in the "yaw" direction and the rocket barrel rotated to change the direction of the downward and rearward jet thrust from the rocket to resist or counteract and correct the "yaw" action of the seat as it is ejected upwardly and forwardly out of the aircraft.

FIG. 3 is a schematic and fragmental perspective view, more adequately showing the operating connection between the top of the rocket barrel and the gyroscope gimbal with the gyroscope rotor therein, and the caging and rotor spinning means.

FIG. 4 is a schematic vertical sectional view taken about on line 4–4 of FIG. 1 to illustrate the connections between the bottom of the rocket barrel and the back of the seat, and its catapult barrel connection at the lower end thereof to the aircraft structure.

DESCRIPTION OF THE PREFERRED EMBODIMENT

Figure 1:
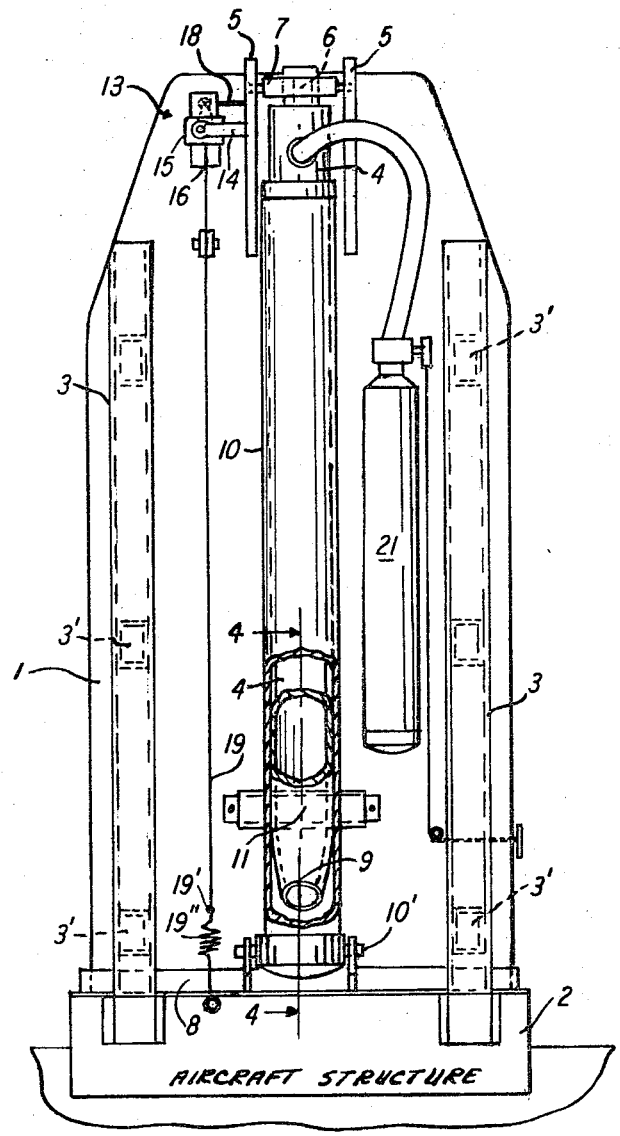
FIG. 1 is a fragmentary somewhat diagrammatic view of the back portion of an aircraft ejection seat schematically illustrating the invention applied thereto.

The invention is designed to eliminate seat "yaw" in the early stage seat ejection or escape trajectory of the seat, before the drogue parachute, mortar projected parachute and the seat separation of the occupant from the main ejected seat structure occurs. When the system is actuated, during the seat ejection cycle a "rate" gyro motor mounted on the seat is automatically spun up a high r.p.m. The gyroscope precesses when the seat "yaws" after leaving its guide rails in the aircraft structure and imparts a corresponding rotative correction to the seat ejection rocket barrel that is carried by the back of the seat. The rocket barrel has a rearwardly inclined jet thrust opening discharging downwardly and rearwardly away from the back of the seat, as near as possible in a vertical plane through the normal center of gravity of the seat. Since the propulsion force from the seat ejection rocket is back of the center of gravity of the seat and its occupant, any lateral shift or change in the center of gravity relative to the rocket thrust will tend to, or cause, the seat to rotate or "yaw" about its "vertical" axis. Precession of the gyroscope as the seat "yaws" rotates the rocket barrel about its centerline to change the rearward direction of thrust from the discharge opening in the lower end of the rocket barrel so as to direct thrust rearwardly to one or the other sides of the vertical plane through the central axis of the barrel containing the "center of gravity" of the seat (and its occupant) to prevent or correct "yaw" rotation of the seat about its vertical axis, so long as the seat ejection rocket burns and produces forward thrust after the seat leaves its guide rails. The seat is thus stabilized against "yaw," and may also be stabilized in pitch, for instance, by means such as shown and described in the patent to McIntyre et al. U.S. Pat. No. 3,362,662.

Referring more particularly to FIG. 1, the reference numeral 1 denotes the back or rear of an aircraft ejection seat while the numeral 2 indicates diagrammatically a portion of the integral aircraft structure carrying the "seat," and includes conventional ejection seat guide rails 3 with cooperating rollers on slides 3' on the seat for guiding the seat 1 upwardly in a vertical direction out of the aircraft when the seat is released and the catapult-rocket seat ejection means 4 and 10 are operated.

The numeral 4 denotes a cylindrical rocket barrel which is secured at its top end to the back of the upper portion of the ejection seat 1 by brackets or other suitable means 5, and is also journaled, as indicated at 6, for rotative adjustment about its central axis.

The barrel 4 is cylindrical and extends downwardly, intermediate the opposite sides of the back of the seat from its connection in the journal block 7 toward the bottom portion 8 of the seat 1, substantially as schematically shown, and is formed with a downward and rearwardly inclined jet thrust discharge opening 9 in its lower end for directing the jet thrust from the lower end of the barrel 4 in a downward and rearward direction away from the back of the seat which, of course, ejects the seat structure 1 upwardly and forwardly out of the aircraft, when released, in case of a suitable emergency.

As shown, the seat ejection rocket barrel 4 is telescopically received in a cylindrical catapult barrel 10 which is secured at its lower end at 10' to the aircraft structure 2 behind the lower portion of the ejection seat 1 and extends upwardly behind the central portion of the seat toward the upper portion of the seat, preferably terminating just below the upper (closed) end of the cylindrical rocket barrel 4. It will be observed that downward and rearward thrust through the opening 9 from the lower end of the rocket barrel 4, after it leaves the catapult barrel 10, as the seat is projected upwardly on its guide rails 3 tends to stress the lower or discharge end of the barrel 4 toward the back of the seat. Suitable buffer means, indicated at 11, may be provided on the back of the seat 1 in front of the barrel 4 for receiving any forward thrust or impact of the lower end of the barrel.

The upper end portion of the rocket barrel 4 has an actuating means, such as an actuating arm 12 projecting outwardly, for instance, forwardly toward the back of the seat.

Rate gyroscope means 13 is suitably carried on the upper portion of the back of the seat 1, at one side of the top of the barrel by suitable brackets 14 and includes gimbal means 15 journaled in the brackets 14 for rotative adjustment about an axis substantially perpendicular to the axis of the barrel 4 and the gimbal means 15 has the gyrorotor 16 journaled therein normal to the gimbal axis. The gimbal 15 has an actuating arm 17 projecting therefrom substantially parallel to the actuating arm 12 from the rocket barrel and an actuating connection, such as a connecting link 18, pivoted at one end to the outer end of the gimbal arm 17 and at its opposite end to the actuating arm 12 that is fixed to the top of the rocket barrel 4.

Thus, after the seat is ejected and leaves its guide rails 3, any "yaw" or rotative movements of the seat about its vertical or longitudinal axis causes relative precession of the gyroscope 13 in the opposing direction which, through the arms 12 and 17 and link 18, rotate the rocket barrel 4 to change the direction of thrust from the rocket discharge opening 9 in a direction to oppose and arrest the "yaw" movement of the seat and return the seat back to its initial position in space relative to its position when it was in the aircraft, immediately prior to its ejection out of the aircraft by the ejection charge from the barrel 4. The gyroscope 13 is normally "caged" prior to seat ejection and the rotor 16 thereof is spun up to its desired r.p.m. by any suitable means, such as a cable 19, which may be wrapped around a suitable barrel or spool on the rotor 16 with its opposite end 19' connected to the seat structure through suitable yieldable spring means 19". The rotor 16 may be held from rotation to keep the cable 19 taut by any suitable means, for instance a soft shear pin 20. This, in effect, keeping the gyro caged against precession until the seat is ejected upwardly causing increased tension on the cable 19 to shear the pin 20, and spin the rotor 16.

Any suitable conventional means may be employed to generate internal ejection pressure in the rocket cylinder 4 and initiate the necessary ejection pressure within the catapult cylinder 10. For instance a suitable burning powder charge may be arranged in the lower or bottom of the catapult cylinder 10 with suitable igniting means under control of the seat occupant. Also to initiate a rocket thrust charge in the rocket cylinder 4, a suitable high pressure medium or explosive charge contained in a suitable pressure container 21 may be carried on the back of the seat with manual initiating means to eject the rocket cylinder 4 out of the catapult cylinder 10.

When it is desired to eject the seat (and its occupant) out of the aircraft, the seat is released for upward travel on the rails 3 by any suitable means, and ejection pressure is initiated in the rocket barrel 4 and in the catapult barrel 10, and the rocket barrel is catapulted out of the catapult barrel and carries the seat upwardly therewith until it leaves the rails (and the rocket barrel 4 leaves the upper end of the catapult barrel 10). This upward movement uncages the gyroscope and spins the rotor, for instance it causes a relative downward pull on the cable 19, shears off the rotor shear pin 20 and spins the rotor 16 up to the necessary high speed rotation.

As the rocket barrel 4 leaves the catapult barrel 10 the downward and rearward jet thrust therefrom through the downwardly inclined jet opening 9 becomes effected to project the seat upwardly and forward out of the way, above the aircraft.

Should the direction of thrust from the opening 9 extend in a vertical plane through the center of gravity at one or the other sides of the center of gravity of the ejected seat and its occupant (as schematically illustrated in FIG. 2), the seat will tend to rotate about its vertical or "yaw" axis. The uncaged gyroscope gimbal 15, with its rotor 16 spinning, will not turn as the seat "yaws" and the link connection 18, of course, will turn the rocket barrel 4 on its vertical bearing 6 to shift the rearward direction of the rocket thrust discharge through the inclined opening 9 in the opposite direction from the direction of seat "yaw," and thus counteract and control "yaw" movement, or "yaw" tendency, so long as any thrust discharge through the opening 9 is present.

The ejection seat in most other respects is conventional in that it may contain a mortar or catapult which ejects a parachute with a static line attached to a releasable seat portion of the ejection seat to lower its occupant, after a suitable time delay. Since these latter features are not pertinent to the invention, they are neither shown nor described in detail. However, suitable stop means may be provided between the actuating arm 12 from the rocket barrel 4 and the rocket barrel journal block 7 to limit the degree of angular or rotative adjustment of the barrel about its central axis from a central position where the rearward and downward thrust is in a vertical plane substantially normal to the back of the seat, for instance not more than a few degrees at either side thereof.

We claim:

1. In an ejection seat structure for upward ejection of the seat out of an aircraft, an ejection seat, a seat ejection catapult comprising, a seat ejection rocket barrel adjustably secured at its upper end to the back of the upper portion of said seat for limited rotative adjustment about its central axis and extending downwardly behind the central portion of the back of said seat toward the bottom thereof, said rocket barrel having a jet thrust discharge opening in the lower end portion thereof inclining downwardly and rearwardly away from the back of said ejection seat, adapted to eject the seat upwardly and forwardly out of the aircraft when the rocket is fired, caged gyroscope means carried by said ejection seat including a rotor, an operating connection from said gyroscope connected to the top of said rocket barrel in offset relation thereto normally holding said barrel against rotation about its central axis in a predetermined position to the back of said seat to control the direction of said downward and rearwardly inclined jet thrust opening in a predetermined rearward direction away from the back of said seat, and gyroscope uncaging means responsive to ejection of said seat for spinning the gyroscope rotor and uncaging said gyroscope caging means, to free said gyroscope for precession thereof in response to any "yaw" movement of said seat following the ejection thereof, to rotatably adjust said rocket barrel about its central axis to adjust the direction of the rocket thrust therefrom through said thrust discharge opening in a direction to resist "yaw" rotation of said ejection seat, as said seat is ejected upwardly and forwardly out of the aircraft structure by said ejection seat rocket.

2. An ejection seat structure as set forth in claim 1, in which said ejection seat catapult comprises a cylindrical catapult barrel adapted to be secured at its lower end to the aircraft structure adjacent the bottom of the ejection seat, said ejection seat rocket comprising a cylindrical rocket barrel telescopically fitting within said cylindrical catapult barrel for ejection thereof by said rocket through the upper end of said catapult barrel to project said ejection seat upwardly out of the aircraft structure, means rotatably securing said rocket barrel at its upper end to the top portion of the back of said seat for rotative adjustment thereof about its central axis, an actuating arm fixed to and projecting outwardly away from the top of the rocket barrel normal to the central axis thereof, and said gyroscope is fixed to said ejection seat at one side of the rocket ejection barrel and includes gimbal means having said rotor therein precessible about an axis substantially parallel to the central axis of said seat ejection rocket barrel, said operating connection comprises a positive actuating connection between said gimbal means and said actuating arm for rotatably adjusting said rocket barrel about its central axis in predetermined relation to precession of said gimbal by said rotor in response to rotation of said ejection seat about its "yaw" axis during the forward and upward ejection thereof out of the aircraft.

3. An ejection seat structure as set forth in claim 2, including connecting means between said rotor and the aircraft structure for spinning said rotor of said gyroscope and releasing said gimbal means for precession thereof incident to ejection of said ejection seat out of said aircraft structure by ejection of said rocket barrel out of said catapult barrel.

4. An aircraft ejection seat structure as set forth in claim 3, which includes rotative adjustment limiting means between said seat ejection rocket barrel and the top of said ejection seat structure to limit rotation of said barrel about its central axis to a predetermining degree at each side of a plane through the central axis of said rocket barrel normal to the back of said ejection seat.